(12) United States Patent
Jaumann

(10) Patent No.: US 6,857,794 B2
(45) Date of Patent: Feb. 22, 2005

(54) CAMERA STAND HEAD

(75) Inventor: Leonhard Jaumann, Munich (DE)

(73) Assignee: Sachtler GmbH, Unterschleissheim (DE)

(*) Notice: Subject to any disclaimer, the term of this patent is extended or adjusted under 35 U.S.C. 154(b) by 91 days.

(21) Appl. No.: 10/362,617

(22) PCT Filed: Aug. 8, 2001

(86) PCT No.: PCT/EP01/09189
§ 371 (c)(1),
(2), (4) Date: Aug. 27, 2003

(87) PCT Pub. No.: WO02/16820
PCT Pub. Date: Feb. 28, 2002

(65) Prior Publication Data
US 2004/0016857 A1 Jan. 29, 2004

(30) Foreign Application Priority Data
Aug. 22, 2000 (DE) .......................... 100 40 960

(51) Int. Cl.[7] .............................................. G03B 17/00
(52) U.S. Cl. ..................................................... 396/428
(58) Field of Search ............................... 396/419, 428; 248/371, 562, 565, 608

(56) References Cited

U.S. PATENT DOCUMENTS

| 2,684,822 | A | * | 7/1954 | Odin | 396/428 |
|---|---|---|---|---|---|
| 3,804,356 | A | * | 4/1974 | Olds | 396/419 |
| 4,621,785 | A | * | 11/1986 | Embra | 396/419 |
| 5,379,991 | A | * | 1/1995 | Delam et al. | 248/562 |
| 6,354,544 | B1 | * | 3/2002 | Muzila | 396/428 |

FOREIGN PATENT DOCUMENTS

| DE | 767478 | 8/1952 |
|---|---|---|
| DE | 1773324 | 10/1971 |
| DE | 2457267 | 6/1976 |
| DE | 2717772 | 10/1978 |
| DE | 3627340 | 2/1988 |
| DE | 29903181 | 6/1999 |

* cited by examiner

Primary Examiner—Christopher Mahoney
(74) Attorney, Agent, or Firm—Dilworth & Barrese LLP.

(57) ABSTRACT

The invention relates to a camera stand head comprising a device (17, 18, 19, 20) for attenuating a tilting movement, and a device for compensating gravity torque occurring during the tilting movement. The device for compensating the gravity torque comprises at least one first, fixed bearing (4), at least one second bearing (5) which is connected to an inclinable part, and at least one torsion spring (7) having adjustable torsion rigidity. Said torsion spring is arranged between the bearings (4, 5) and comprises at least one spring bar (8), the axis of the spring bar being spatially offset in relation to the central axis (15) of the torsion spring (7). The characteristic curve (torque over angle of rotation) of the torsion spring extends essentially in a sinusoidal manner.

20 Claims, 5 Drawing Sheets

Fig. 4
Fig. 5
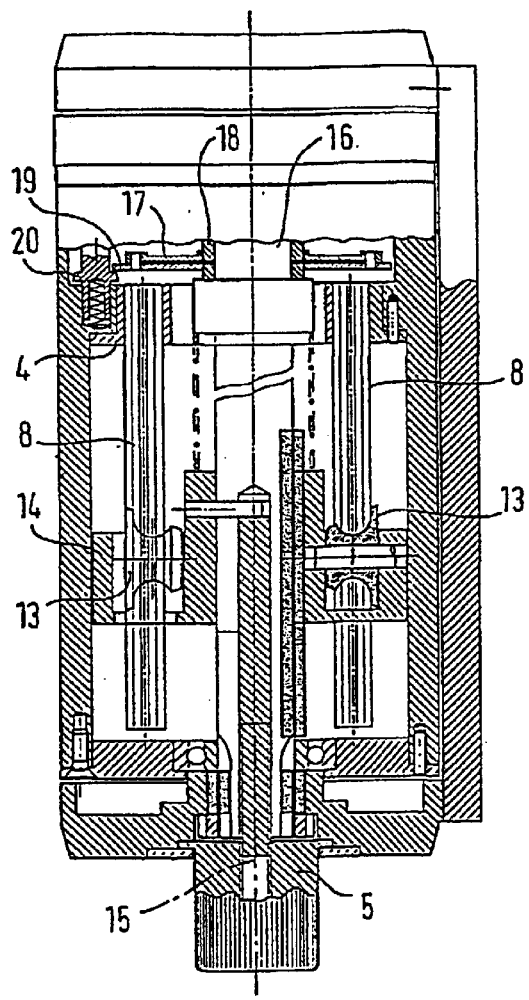
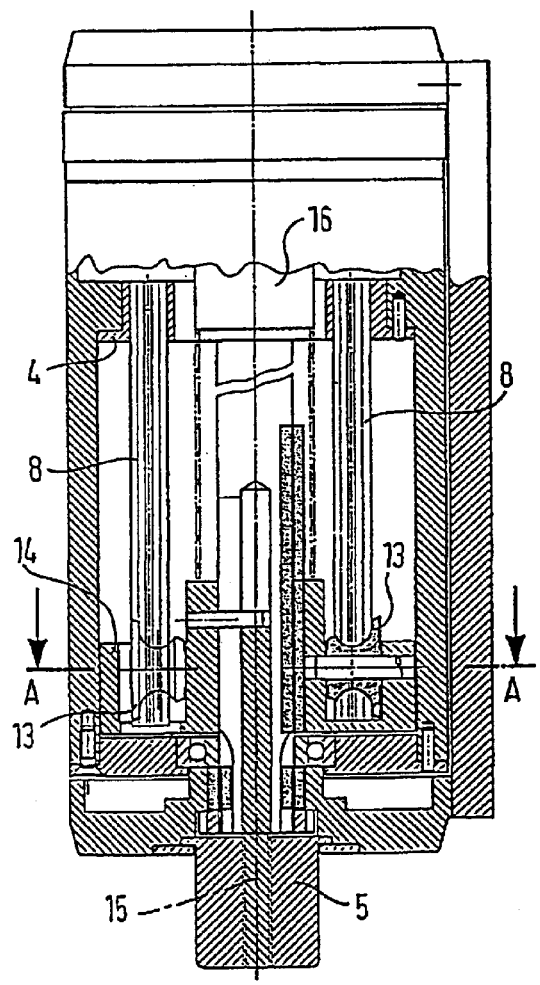

CAMERA STAND HEAD

BACKGROUND OF THE INVENTION

1. Technical Field

The present invention relates to a camera stand head comprising a device for attenuating a tilting movement, and a device for compensating gravity torque occurring during this tilting movement.

Cameras which cannot be hand-held, for example owing to their weight or size or owing to specific requirements of a smooth camera movement, are rested on a camera stand or a camera pedestal. The camera is therefore mounted on a camera stand head so as to be rotatable about a horizontal axis (tilting axis) and a vertical axis (swivel axis) so that the cameraman can follow moving objects with the camera lens. (In the following, only the expression "camera stand" is used; the statements are, however, also valid for camera pedestals). When tilting the camera, i.e. when rotating the camera stand head about its tilting axis, the distance of the centre of gravity of the camera from this tilting axis (height of the centre of gravity) together with the weight of the camera causes a torque about the tilting axis, which is dependent on the tilting angle.

The weight compensation device is supposed to allow a force-free tilting of the camera by compensating this tilting torque. It is thus necessary for the weight compensation to be quickly and easily adaptable to different weights and different heights of the centre of gravity owing to the rapid change of the load torque when putting on different cameras or camera accessories such as teleprompters etc.

Furthermore, the weight compensation is supposed to hold the camera directly in any tilting position without any subsequent movement, and this within a tilting range of at least ±90°, in order to be able to cover the entire spatial field of vision when tilting the camera.

To allow gentle tilting movements, the camera stand head should furthermore comprise an attenuating device which is independent of weight compensation and is preferably also adjustable.

2. Prior Art

Known camera stand heads comprise, for example, a hydraulic attenuator having an adjustable torsional resistance to attenuate the tilting movement, as is described in the German patent specification 24 57 267.

Regarding weight compensation, it is known, for example, to compensate the tilting torque with several disk torsion springs made of rubber and arranged consecutively on the tilting axis. Weight compensation can be adapted here by the connection or disconnection of individual springs. It is furthermore known to compensate the tilting torque by means of series connected pressure or tension springs.

If the centre of gravity of the camera lies exactly vertically over the tilting axis at a tilting angle of 0°, the tilting torque has a sinusoidal characteristic curve. The characteristic curve (torque over angle of rotation) of the known arrangement of disk torsion springs is, however, approximately linear so that although it roughly concurs with the sinusoidal characteristic curve of the tilting torque in a tilting range of 0° to approximately 45°, it does, however, deviate increasingly from this characteristic curve at tilting angles of >45°. The compensation torque is therefore too great at large tilting angles and thus a subsequent reverse movement of the camera occurs in the direction of the compensation position.

SUMMARY OF THE INVENTION

The object of the present invention is thus to create a camera stand head having a device for attenuating a tilting movement and a device for compensating gravity torque occurring during this tilting movement, which compensates the tilting torque more accurately.

This object is solved according to the invention by means of a camera stand head having the features herein.

Therefore, the device for compensating gravity torque comprises at least one first, fixed bearing, at least one second bearing connected to an inclinable part and at least one torsion spring arranged between these bearings, said torsion spring having adjustable torsion rigidity and comprising at least one spring bar, the axis of said spring bar being spatially offset in relation to the central axis of the torsion spring, with the characteristic curve (torque over angle of rotation) of the torsion spring extending essentially in a sinusoidal manner.

The sinusoidal characteristic curve of the torsion spring is formed on the basis of the arrangement of the spring bar or spring bars parallel to the axis of the torsion spring. When twisting the entire torsion spring, the spring bars are deflected, with the type of stress of the spring bars (bending and possibly torsion) and thus also deflection being dependant on how the spring bars are arranged in the two bearings of the torsion spring. The different possibilities of fixing will be discussed below. In any case, the spring rigidity of the torsion spring of the camera stand head according to the invention is adapted to the weight of the camera which is currently located on the camera stand head and then has characteristics which correspond exactly to the characteristics of the gravity torque of the camera when tilting about the tilting axis: when the centre of mass of the camera lies exactly vertically above the tilting axis, no torque is created by the torsion spring. When the camera is tilted from the resting position, the tilting torque caused by the weight of the camera increases in a sinusoidal manner as the tilting angle increases and the compensation torque generated by the torsion spring also simultaneously increases in a sinusoidal manner. The tilting torque will thus be compensated by an equally large counter-torque at any tilting angle so that the camera remains balanced in any tilting position. The cameraman then only requires minimal strength to tilt the camera and the camera remains at any tilting angle.

The curve of the compensation torque corresponds to the curve of the tilting torque when tilting the camera in the entire tilting range of at least +90° so that the camera can be tilted at large angles with just as little strength as at small angles and that also at large angles, the camera remains in any desired position without subsequent movement.

In an advantageous design of the camera stand head according to the invention, the torsion rigidity of the torsion spring can be smoothly adjusted. The spring rigidity can thus be precisely adapted to cameras having any weight and any height of the centre of gravity, with common cameras, including accessories, having a weight of up to 150 kg and a height of the centre of gravity of up to 50 cm. In the case of teleprompters and other camera accessories which can also be mounted on the camera stand head according to the invention, there may be weight and leverage ratios which differ therefrom; the gravity torque caused by such superstructures can also be compensated by the weight compensation device according to the invention.

There are various possibilities for adjusting the torsion spring rigidity. In a first advantageous design of the invention, the second bearing of the weight compensation device connected to the inclinable part is axially shiftable in relation to the fixed bearing and furthermore comprises a coulisse in which the bar ends of the spring bars can slide.

When shifting the second bearing relative to the first bearing, the ends of the bars slide in the coulisse of the second bearing, whereby the spring bars are subjected to bending stress and are thus deflected and pre-stressed. This deflection changes the effective lever of the spring bars during the torsional movement of the entire torsion spring, and thus changes the torsion spring rigidity, with the curve of the compensation torque, however, being constantly sinusoidal.

In order to adjust the torsion spring rigidity, an adjusting device can alternatively or additionally be provided, which is arranged between the two bearings of the torsion spring and is shiftable along the axis of the spring bars. The adjusting device is thus preferably formed in such a way that it changes the effective length of the spring bars so that they are only resiliently deformed in a partial area rather than across their entire length when the torsion spring is twisted. A dynamic influence of the effective spring length is then also possible, whereby the characteristic curve of the torsion spring can be adapted to specific requirements.

The spring bars can generally only be fixed in the first bearing or in the first and second bearing. When the torsion spring is twisted, the stress of the spring bars changes depending on the fixing thereof: if the spring bars are free at one end, they will only be subjected to bending stress and if they are fixed at both ends, they will be subjected to both bending and torsional stress. This different stress affects the curve of the compensation torque and can thus be used to optimise this curve.

There are also several possibilities with regard to the design of the individual spring bars. An individual spring bar can thus be designed, for example, as a cylindrical bar, a slitted tube, a square bar or as a conical bar. A slightly changed characteristic curve of the spring will occur depending on the design of the spring bar. Instead of a single spring bar, a bundle of spring bars can also be used, the deflection state of which will differ from the deflection state of an individual spring bar during twisting. Thus, the characteristic curve of the spring can be influenced and adapted to the respective ratios.

Finally, to further change and optimise the shape of the characteristic curve, an attenuating insert or coating of the spring elements can, for example, be provided.

BRIEF DESCRIPTION OF THE DRAWINGS

Embodiment examples of the invention are described in more detail below with regard to the enclosed drawings.

FIGS. 4 and 5 show a schematic view of a second embodiment of a camera stand head according to the invention.

DETAILED DESCRIPTION OF THE PREFERRED EMBODIMENTS OF THE INVENTION

Figure 1:
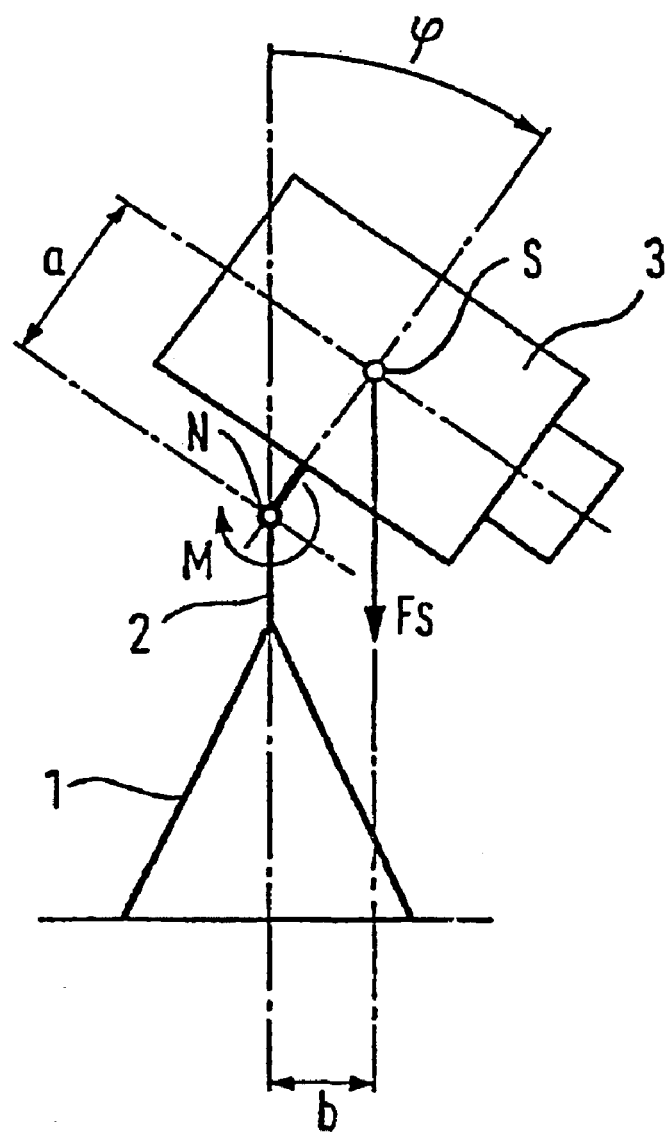
FIG. 1 shows a schematic view of a camera stand.

FIG. 1 schematically shows a camera stand 1 having a camera stand head 2 as well as a camera 3 mounted thereon. The camera has been moved about the tilting angle $\phi$ with regard to its balanced position, in which the centre of gravity S thereof is located exactly vertically over the tilting axis N running traverse to the drawing plane. Owing to the distance a of the centre of gravity of the camera from the tilting axis N, a lever arm $b = a \sin \phi$ is formed which, together with the weight Fs of the camera, causes a tilting torque M about the tilting axis N. As the angle $\phi$ increases, the tilting torque $M = Fs\ a \sin \phi$ increases in a sinusoidal manner.

Figure 2:
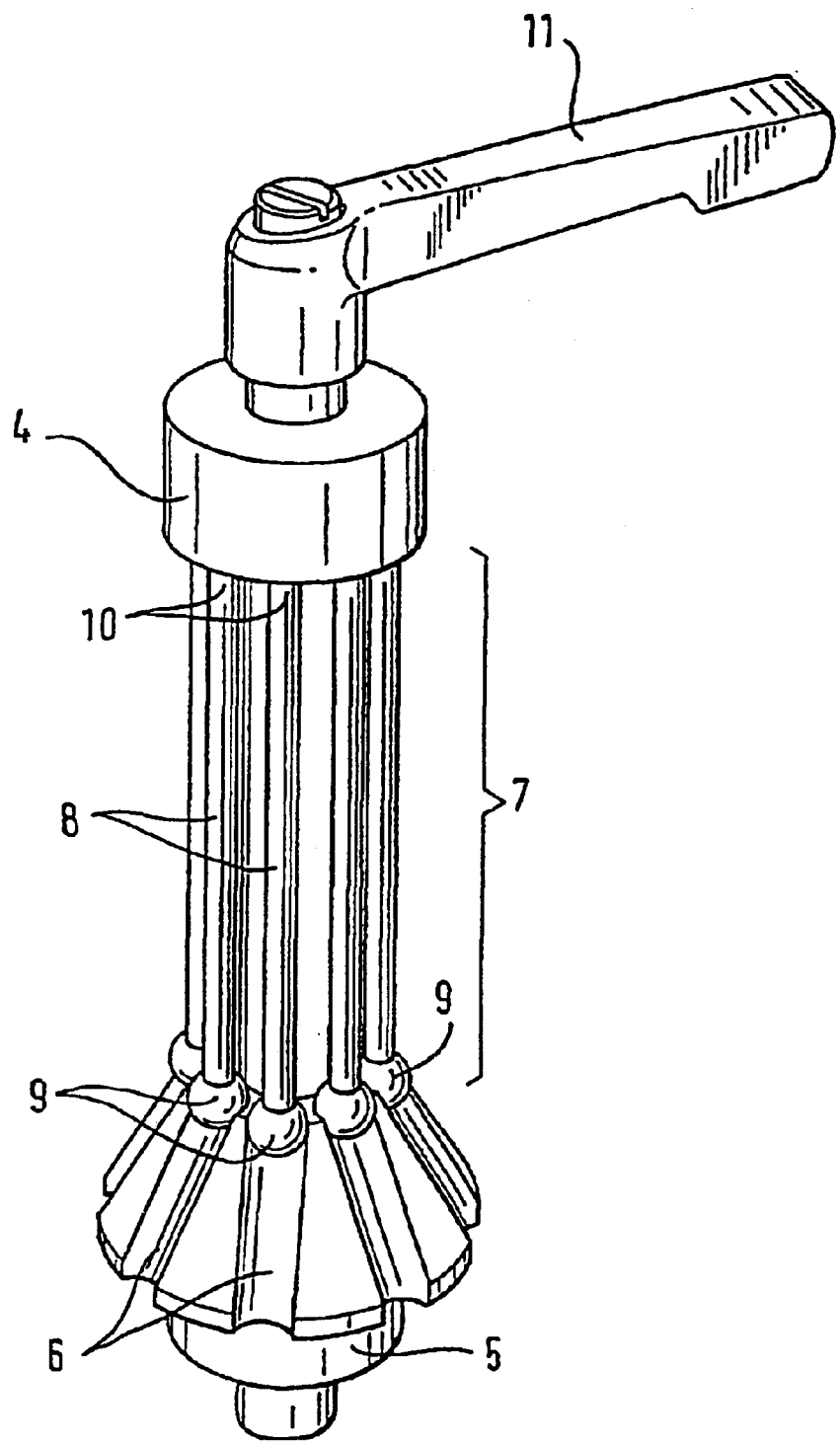
FIG. 2 shows a weight compensation device for a camera stand head according to the first embodiment of the invention.

FIG. 2 shows a device for compensating this tilting torque which increases in a sinusoidal manner. The device comprises a torsion spring 7, a first, fixed bearing 4 as well as a second bearing 5 which is connected with the inclinable part of the camera stand. The second bearing 5 is configured in a conical manner and comprises grooves 6, the axes of which intersect the main axis of the torsion spring 7.

The grooves extend straightly in the embodiment example; however, the grooves could also be designed in a curved manner in order to allow the characteristic curve of the torsion spring to extend according to specific requirements. The axes of the grooves can furthermore extend skew to the main axis of the torsion spring.

The torsion spring comprises a series of spring bars 8 which are provided with ball-shaped end pieces 9 at one end, which are slideably arranged in the grooves 6 of the second bearing 5. The opposite ends 10 of the spring bars are arranged in the first bearing 4 in such a way that they are not prevented from rotating about their own axis and are furthermore axially shiftable.

When tilting the camera, the second bearing. 5, which is connected with the inclinable part of the camera stand, is thus twisted relative to the first bearing 4 so that the torsion spring 7 is twisted. If the ends 9 of the spring bars are not fixed in the second bearing 5, rather are able to rotate about their own axis in this bearing, they are only subjected to bending stress when the entire system is twisted. If the spring bars were prevented from rotating about their own axis in both bearings 4 and 5, they would additionally be subjected to a torsional stress. The characteristic curve of the torsion spring has the sinusoidal curve shown in FIG. 3.

Figure 3:
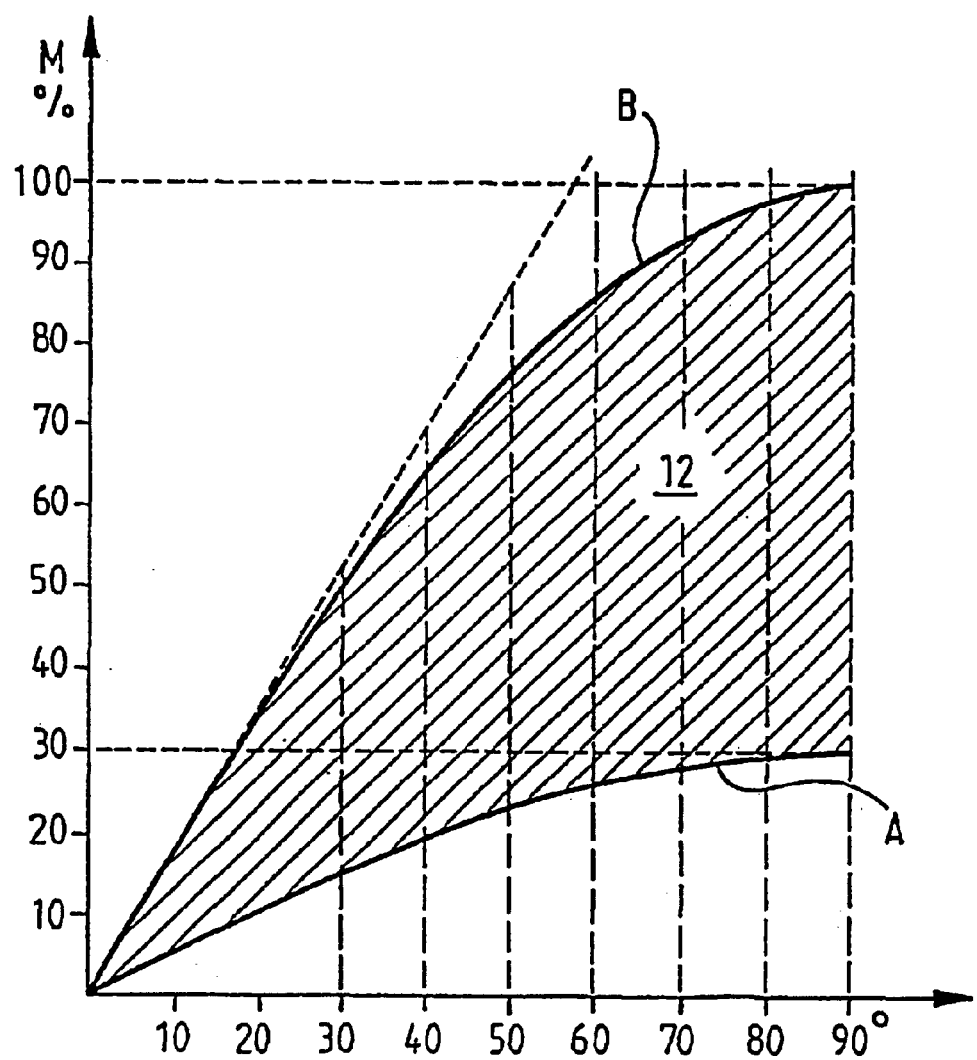
FIG. 3 shows a torque characteristic curve (torque over angle of rotation) of a camera stand head according to the invention.

The second bearing 5 can be smoothly shifted along the main axis of the torsion spring 7. When shifting the second bearing 5 in the direction of the first bearing 4 in FIG. 2, the ball ends 9 of the spring bars 8 slide in the grooves 6 of the second bearing 5. Owing to the conical shape of the second bearing 5, the spring bars 8 are bent when doing so, i.e. the ball ends of the spring bars are spread apart. Therefore, if the second bearing 5 is twisted in the axially shifted state relative to the first bearing 4, a characterising curve deviating from the non-shifted state occurs. FIG. 3 clarifies this difference: if the second bearing is not axially shifted, i.e. if the spring bars are not spread apart, a flatter characterising curve A occurs. If the second bearing is axially shifted to the maximum in the direction of the first bearing, a steeper characterising curve B occurs so that correspondingly larger gravity torques of a heavier camera can be compensated. Within the adjustment range labelled as 12 in FIG. 3, any sinusoidal characterising curves can be formed by adjusting the torsion spring rigidity. A change in the spatial extension of the grooves in grooves in the moveable bearing can also cause a change in the characterising curve.

The axial shifting of the second bearing in the direction of the first bearing can be carried out by means of a simple adjusting lever 11 on the camera stand head, which furthermore enables the second bearing to be stopped in any axial position. The torsion spring rigidity can thus be quickly, easily and precisely adapted to different camera weights or other changes in weight.

FIGS. 4 and 5 show a second embodiment example of the camera stand head according to the invention. The spring bars 8 are fixed at one end in a first bearing 4 and are mounted at their other end by means of rolls 13 which are intended in this embodiment to adjust the effective spring length. These rolls are connected with the torsion axis 15 via carriers 14 and thus with a second bearing 5 which is in turn connected with the inclinable part of the camera stand head. When the second bearing 5 is twisted relative to the first bearing 4, the twisting movement is accordingly transferred to the spring bars 8 via the torsion axis 15, the carriers 14 and the rolls 13. The rolls 13 are therefore individually shiftable along the axis of the respective spring bars. Since the rolls 13 in the state represented in FIG. 5 are shifted further in the direction of the second bearing 5 than those in FIG. 4, the effective spring length of the spring bars 8 represented in FIG. 5 is correspondingly longer than that of the spring bars 8 represented in FIG. 4. The device for attenuating the tilting movement can also be seen from FIG. 4. Annular discs 17 and distancing tubes 18 are alternately arranged on a shaft 16 whose torsion movement is to be attenuated. An intermediary disc 19 is assigned to each annular disc 17.

An attenuating liquid is located between the annular discs 17 and the intermediary discs 19. The intermediary discs 19 are engaged at their outer periphery with a coupling element 20. This coupling element 20 allows any number of intermediary discs 19 and annular discs 17 to be locked relative to the casing, i.e. to be prevented from turning. A hydraulic attenuating force occurs owing to the relative movement of the annular discs 17, with it being possible to adjust the degree of attenuation of the device by means of the number of annular discs 17 and intermediary discs 19 which are locked relative to the casing.

Figure 6:
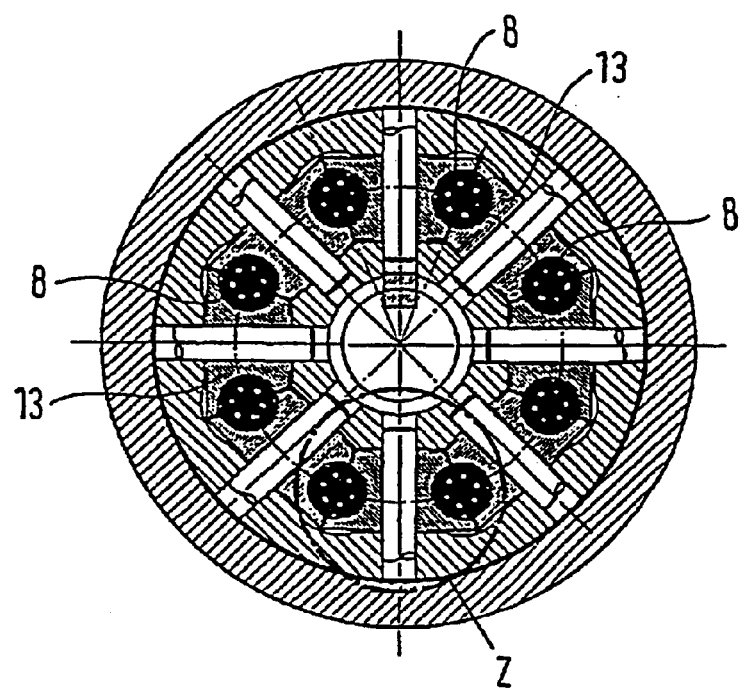
FIG. 6 shows a sectional view along the line A—A in FIG. 5.
Figure 7:
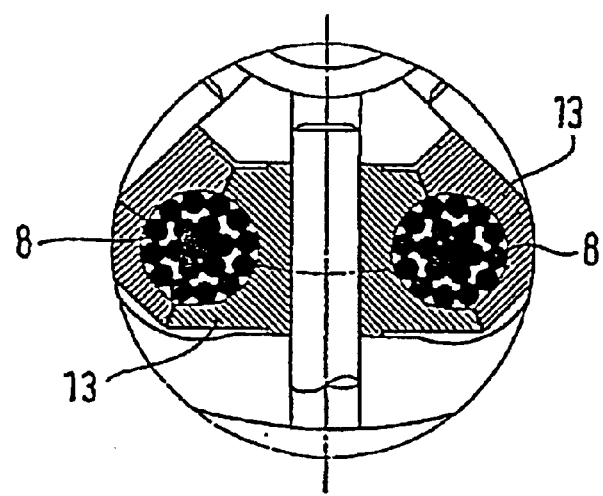
FIG. 7 shows a detailed view of section Z in FIG. 6.

FIG. 6 is a sectional view along the line A—A in FIG. 5, in which the arrangement of the rolls 13 and the spring bars 8 is clearly shown again. It can be seen in particular from the detailed view in FIG. 7 that bundles of spring bars 8 are used in this embodiment.

What is claimed is:

1. A camera stand head having a device (17, 18, 19, 20) for attenuating a tilting movement and a device for compensating gravity torque occurring during the tilting movement, characterised in that the device for compensating gravity torque comprises at least one first fixed bearing (4), at least one second bearing (5) connected with an inclinable part as well as at least one torsion spring (7) arranged between said bearings (4, 5), said torsion spring having adjustable torsion rigidity and comprising at least one spring bar (8), the axis of said spring bar being spatially offset in relation to the central axis (15) of the torsion spring (7), with the characteristic curve (torque over angle of rotation) of the torsion spring (7) extending essentially in a sinusoidal manner.

2. A camera stand head according to claim 1, characterised in that the torsion rigidity of the torsion spring (7) can be smoothly and continuously adjusted.

3. A camera stand head according to claim 2, wherein the torsion rigidity of the torsion spring (7) is adjustable by axially shifting at least one bearing (4, 5).

4. A camera stand head according to claim 1, wherein the torsion rigidity of the torsion spring (7) is adjustable by axially shifting at least one bearing (4, 5).

5. A camera stand head according to claim 1, wherein the device for compensating gravity torque comprises an adjusting device for adjusting the torsion spring rigidity of the torsion spring, which is arranged between the first (4) and second (5) bearings to be shiftable along the axis of the spring bars (8).

6. The camera stand head according to claim 1, wherein the spring bars (8) are fixed in an axial direction in a bearing (4, 5) at at least one end (9, 10) of the bar.

7. A camera stand head according to claim 1, wherein the spring bars (8) are fixed at at least one end (9, 10) of the bar in a bearing (4, 5) in such a way that they are prevented from rotating about their own axis at this end (9, 10) of the bar.

8. A camera stand head according to claim 1, wherein the spring bars (8) are shiftably mounted in a bearing (4, 5) at at least one end (9, 10) of the bar.

9. A camera stand head according to claim 8, characterised in that the spring bars (8) are mounted in a bearing (4, 5) at at least one end (9, 10) of the bar so as to be shiftable along an axis which intersects the main axis (15) of the torsion spring (7).

10. A camera stand head according to claim 8, characterised in that the spring ends (8) are mounted in a bearing (4, 5) at at least one end (9, 10) of the bar so as to be shiftable along an axis which lies skew to the main axis (15) of the torsion spring (7).

11. A camera stand head according to claim 8, characterised in that the spring bars (8) are mounted in a bearing (4, 5) at at least one end (9, 10) of the bar so as to be shiftable along an axis which lies parallel to the main axis (15) of the torsion spring (7).

12. A camera stand head according to claim 8, wherein the ends (9, 10) of the bars move along the axis in a straight line when shifted.

13. A camera stand head according to claim 8, wherein the ends (9, 10) of the bars move along the axis in a curved line when shifted.

14. A camera stand head according to claim 1, wherein the spring bars (8) are rotatably mounted in a bearing (4, 5) at at least one end (9, 10) of the bar.

15. A camera stand head according to claim 1, wherein the spring bars (8) are provided with the ball-shaped end pieces at at least one end (9, 10) of the bar and at least one bearing (4, 5) comprises grooves into which the ball-shaped end pieces engage.

16. A camera stand head according to claim 1, wherein the spring bars (8) are mounted in a bearing (4, 5) at at least one end (9, 10) of the bars by means of rolls (13).

17. A camera stand head according to claim 1, wherein several spring bars (8) arranged at regular intervals across the circumference of the torsion springs (7) are provided.

18. A camera stand head according to claim 1, wherein the camera stand head comprises several torsion springs (7) arranged to be connected in series or in parallel or are stacked.

19. A camera stand head according to claim 1, wherein the spring bars (8) are configured as cylindrical bars, slitted tubes, square bars or as conical bars.

20. A camera stand head according to claim 1, wherein the torsion spring (7) comprises at least one bundle of spring bars (8) instead of at least one individual spring bar (8).

* * * * *